United States Patent [19]

Guinn

[11] Patent Number: 4,813,296
[45] Date of Patent: Mar. 21, 1989

[54] FLYWHEEL SICKLE DRIVE MECHANISM

[75] Inventor: Ronald K. Guinn, Valley Center, Kans.

[73] Assignee: Hesston Corporation, Hesston, Kans.

[21] Appl. No.: 84,410

[22] Filed: Aug. 10, 1987

[51] Int. Cl.$^4$ ............................................. F16C 3/04
[52] U.S. Cl. ...................................... 74/595; 74/44; 403/341; 403/370
[58] Field of Search ................. 74/595, 596, 44, 25; 403/341, 374, 314, 370; 56/296

[56] References Cited

U.S. PATENT DOCUMENTS

| | | | |
|---|---|---|---|
| 572,497 | 12/1896 | Bragg | 74/595 |
| 1,383,488 | 7/1921 | Schaffer | 74/603 |
| 1,436,347 | 11/1922 | Krider | 403/370 X |
| 1,785,171 | 12/1930 | Adams et al. | 403/370 X |
| 1,799,813 | 4/1931 | Hinderliter | 74/595 |
| 2,800,809 | 7/1957 | Pike | 74/595 |
| 2,966,968 | 1/1961 | Skeel | 403/370 |
| 3,304,099 | 2/1967 | Jankowski | 403/341 |
| 3,941,003 | 3/1976 | Garrison et al. | 74/44 |
| 4,025,213 | 5/1977 | Schafer et al. | 403/370 |
| 4,095,911 | 6/1978 | Lacroix | 403/370 X |
| 4,304,502 | 12/1981 | Stratienko | 403/370 |
| 4,464,076 | 8/1984 | Leibhard | 403/370 X |

FOREIGN PATENT DOCUMENTS

| | | | |
|---|---|---|---|
| 130773 | 1/1949 | Australia | 74/596 |
| 938459 | 12/1973 | Canada | 403/370 |
| 717230 | 2/1942 | Fed. Rep. of Germany | 74/595 |
| 1346363 | 2/1974 | United Kingdom | 403/370 |

Primary Examiner—Richard E. Moore
Assistant Examiner—Vinh Luong
Attorney, Agent, or Firm—Hovey, Williams, Timmons & Collins

[57] ABSTRACT

An eccentric drive mechanism includes two shafts that are coupled to a wheel-like drive member such as a pulley, with one of the shafts being in offset relation to the other shaft and the central axis of the drive member. Each shaft represents inclined, flat wall portions in mutual inter-engagement, and the wall sections are releasably brought into a position of wedging contact with each other and to the drive member in order that the rotative position of one of the shafts is retained in a certain, predefined orientation relative to the rotative position of the other shaft and to the drive member. The drive member is supported on both sides to avoid imposition of cantilever-type loadings, and the mechanism can be readily disassembled and re-assembled when desired to realign and reposition the rotative orientation of the two shafts relative to the drive member. The eccentric shaft is coupled to a sway bar of the header for oscillation of the sickle.

7 Claims, 1 Drawing Sheet

U.S. Patent  Mar. 21, 1989  4,813,296
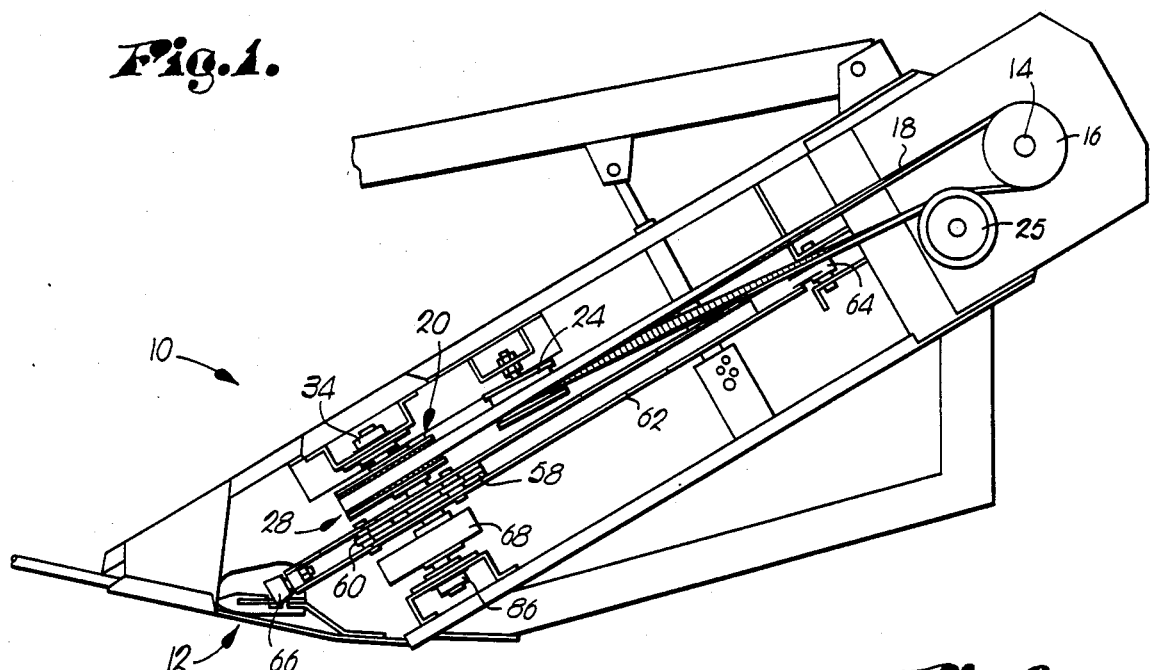
Fig.1.
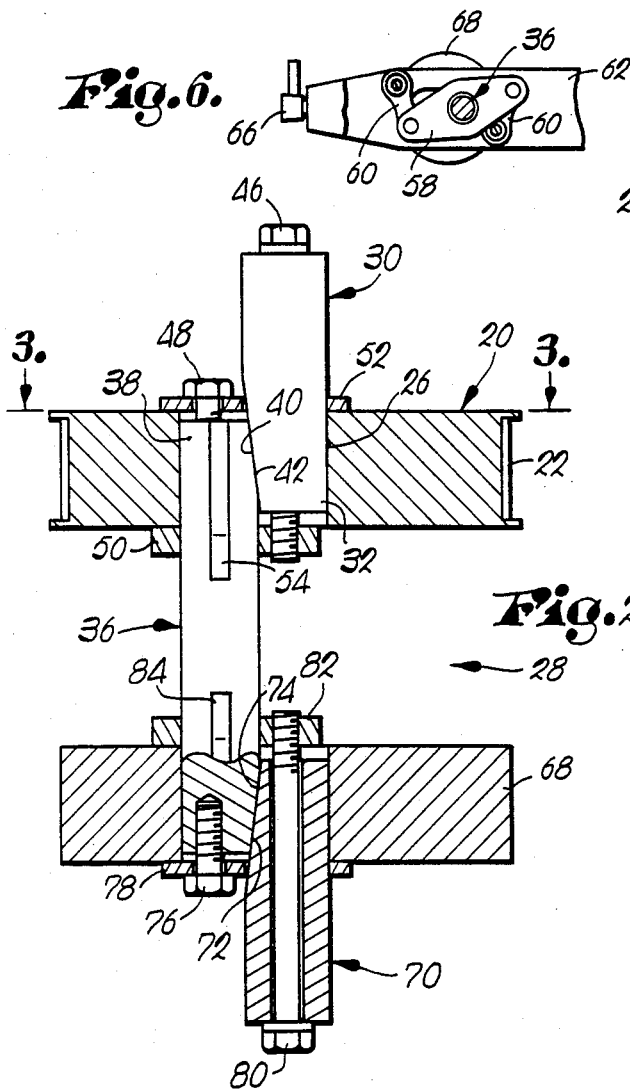
Fig.6.
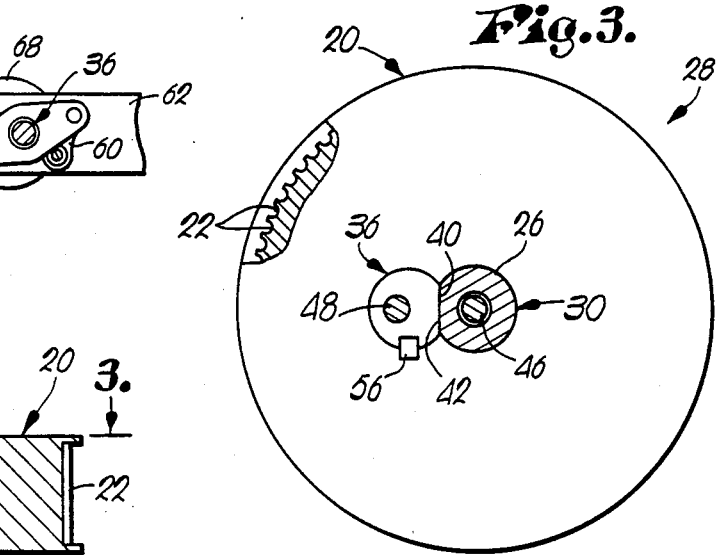
Fig.3.
Fig.2.
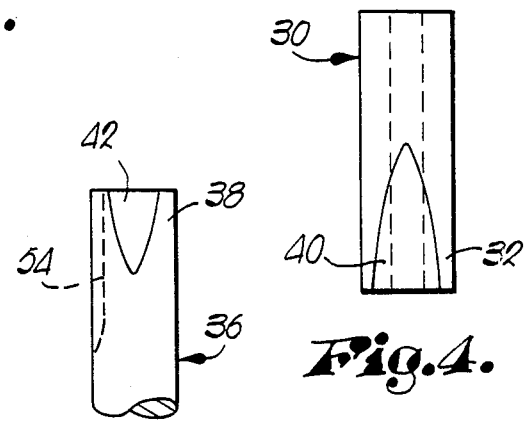
Fig.5.
Fig.4.

FLYWHEEL SICKLE DRIVE MECHANISM

BACKGROUND OF THE INVENTION

1. Field of the Invention

This invention broadly relates to a releasable, eccentric drive mechanism for reciprocating a sway bar used in harvesting and mowing equipment. More particularly, the drive mechanism of the present invention includes a wheel-like drive member such as a pulley that is supported for rotation about its central axis by a first shaft, and a second shaft connected to the drive member on an opposite side thereof and to the sway bar is disposed in offset relation to the first shaft for oscillation of the bar. The first and second shaft each present facing, inclined flat wall sections in wedging engagement with each other to retain the rotative position of the second shaft at a precise, pre-determined orientation relative to the first shaft and to the drive member in order to facilitate assembly and thereafter the mechanical strength of the interconnection and also, for example, to enable a flywheel connected to the second shaft remote from the drive pulley to be maintained in the proper, aligned relationship to the latter.

2. Description of the Prior Art

Certain types of mowers and harvesters are provided with a single or double sickle assembly which extends across the front of the implement for severing a crop as the implement is advanced across the field. Oftentimes, such sickles are reciprocated in a longitudinal direction by an oscillating sway bar which pivots adjacent the side of the implement about an upright axis. A source of rotary power is eccentrically coupled to the sway bar by an arangement of linkages for oscillation of the bar and thereby the sickle.

One example of a sickle drive mechanism is described in U.S. Pat. No. 3,941,003 dated Mar. 2, 1976 and assigned to the assignee of the present invention. The drive mechanism disclosed in U.S. Pat. No. 3,941,003 includes a drive shaft connected to a source of power, a semicircular weight fixed to the drive shaft, and a second shaft secured to the weight in offset or eccentric relationship to the drive shaft; in addition, the second shaft is coupled by means of a special linkage including a pair of pitman links to a sway bar for oscillation of the latter to effect a corresponding reciprocation of the sickle. In order to provide a better understanding of the subject matter of the present invention, the disclosure of the U.S. Pat. No. 3,941,003 is hereby expressly incorporated into the disclosure of the present document.

Recently, other types of drive mechanisms have been developed for sickle assemblies wherein the sway bar is coupled to a source of rotary power by means of a wheel-like drive member such as a pulley having a series of recesses for receiving a toothed belt. The pulley is supported for rotation about its central axis by a first shaft connected to a bearing, and a second shaft eccentrically mounted on the pulley in offset relationship to the first shaft is coupled by a set of linkages to the sway bar for timed oscillation of the latter. Optionally, a counterweight or flywheel may be secured to the second shaft remote from the pulley, and a third shaft coupled to the central axis of the counterweight in aligned, coaxial relationship with the first shaft cooperates with the first shaft to support of the drive member during rotation thereof.

Certain of the eccentric drive mechanisms known to those in the art are constructed by permanently fixing, as by welding, one shaft to another so that the longitudinal axes of the respective shafts are maintained in parallelism during operation of the machine. A counterweight, if used, is fixed in a desired, pre-selected rotative orientation relative to the second shaft so the counterweight is correctly positioned for dynamically balancing the rotative forces generated by other components of the drive mechanism including the drive pulley. Such construction, however, requires precise manual alignment of the shafts during assembly of the mechanism, and further prohibits ready disassembly when, for instance, maintenance is needed.

Hence, it would be a desirable advance in the art if an eccentric drive mechanism was provided having two, offset shafts connected to a wheel-like drive member in such a manner that both shafts can be released from the member without extensive labor or modification of the mechanism. Moreover, such a mechanism, when assembled, should provide a means for securing rigidly both of the shafts to the drive member in such a fashion that the rotative position of each shaft is maintained in a desired, preselected orientation.

SUMMARY OF THE INVENTION

The present invention represents a significant advance in the art by provision of an eccentric drive mechanism which includes a wheel-like drive member, a first shaft and a second shaft offset from the first shaft, wherein both of the shafts may be readily released from the drive member when desired. Each shaft presents an end portion received in a respective cylindrical region of an opening formed in the drive member, and the end portions include flat, inclined wall sections in mutual interengagement for securely maintaining the rotative position of one shaft in a selected orientation relative to the other shaft. The mechanism finds particular utility for interconnecting a sway bar of a sickle assembly with a rotational source of power; however, the mechanism may also be used in other devices where an offset drive mechanism is employed.

The present invention is particularly advantageous in instances where, for example, a flywheel is connected to the offset, second shaft remote from the drive pulley or, alternatively, where a third shaft is coupled to the second shaft in aligned, coaxial relationship with the longitudinal axis of the first shaft in order to provide support for each side of the drive member and of the second shaft during rotation thereof. The flat wall sections insure that the flywheel and the third shaft are correctly aligned at all times with the wheel-like drive member and with the first shaft.

In preferred forms of the invention, bolts extending along the longitudinal axes of the shafts are provided for drawing the end portions of the shafts into the respective regions of the opening and for bringing the flat wall sections of each shaft end portion into secure, wedging contact with each other. In addition, two keys may be installed in respective grooves located on opposite end portions of the second shaft and corresponding grooves in the drive member opening and the flywheel opening so that alignment of the first shaft with the third shaft is assured.

Other and further objects of the invention will be made clear in the course of the following description of a preferred embodiment of the invention.

BRIEF DESCRIPTION OF THE DRAWINGS

FIG. 1 is a fragmentary, side elevational view of a harvester header having a sickle assembly, a sway bar and a releasable, eccentric drive mechanism constructed in accordance with the principles of the present invention;

FIG. 2 is an enlarged side cross-sectional view of the drive mechanism shown in FIG. 1 with parts broken away in section and with certain components and linkages interconnecting the drive mechanism with the sway bar removed for clarity;

FIG. 3 is an enlarged view taken along line 3—3 of FIG. 2 to further illustrate the orientation of two shafts of the drive mechanism relative to a wheel-like drive member of the same, with a portion of a flange of the drive member being broken away to depict a series of grooves for receiving a toothed belt;

FIG. 4 is an enlarged front elevational view of one of the shafts of the drive mechanism illustrated, for example, in FIGS. 2 and 3 and showing a flat, inclined wall section formed on an end portion of the shaft;

FIG. 5 is a fragmentary, enlarged rear elevational view of the other shaft of the drive mechanism depicted in FIGS. 2 and 3 and illustrating a flat wall section which is normally retained in wedging contact with the flat wall section of the shaft shown in FIG. 4 when the mechanism is assembled; and FIG. 6 is an enlarged, fragmentary top view of the linkages and other components connecting the second shaft shown in FIG. 5 to the sway bar.

DETAILED DESCRIPTION OF THE DRAWINGS

Referring initially to FIG. 1, a harvesting header is broadly designated by the numeral 10 in FIG. 1 and includes a sickle assembly 12 which is mounted across the front of header 10. The sickle assembly 12 includes a sickle which reciprocates longitudinally in a known fashion to cut a swath in the field as the header 10 is advanced over the ground.

A source of power for driving the sickle assembly 12 includes a drive shaft 14 connected to a rotational motive power source as well as a first drive sprocket 16 that has a series of circumferentially disposed, parallel grooves for receiving semicircular teeth of a drive belt 18. The belt 18 is also trained about a second, driven sprocket which represents a wheel-like drive member 20 that is also depicted in FIG. 3. A portion of an outer, circular, flanged wall of the drive member 20 is cut away in FIG. 3 for illustrative purposes to show a series of parallel, semicircular grooves 22 which sequentially receive the teeth of the belt 18. In addition, two idler pulleys 24, 26 guide a return portion of the belt 18 and twist the same about its longitudinal axis as the latter approaches the drive member 20 during advancement of the belt 18 about its closed loop path of travel.

Viewing FIG. 3, the drive member 20 has structure 26 defining an opening which includes a first, generally cylindrical region and a second generally cylindrical region complemental in configuration to the first generally cylindrical region. The second region is disposed in side-by-side relationship to the first region in direct, open communication with the latter.

A drive mechanism, broadly designated 28, includes the aforementioned drive member 20 as well as a first right cylindrical shaft 30 having a longitudinal axis coincident with the central, rotational axis of drive member 20. The first shaft 30 has an end portion 32 (FIGS. 2-4) which is received in the first region of the structure 26 defining the opening in the drive member 20. Another end portion of the first shaft 30 remote from portion 32 is received in a bearing assembly 34 (FIG. 1) that is, in turn, secured to a bracket of the frame of header 10.

The drive mechanism 28 also includes a second right cylindrical shaft 36 that has an end portion 38 (FIGS. 2-4) received in the second region of the structure 26 defining the drive member opening. The second shaft 36 extends along a reference axis laterally offset and parallel to the longitudinal axis of first shaft 30 as well as the central axis of drive member 20.

Referring now to FIGS. 2 and 4, the end portion 32 of the first shaft 30 presents an inclined, flat wall section 40. Moreover, as shown is FIGS. 2 and 5, the end portion 38 of the second shaft 36 includes a flat, inclined wall section 42 parallel to wall section 40. The wall sections 40, 42 extend in a plane perpendicular to a reference plane which passes through the central axis of drive member 20, the longitudinal axis of first shaft 30 and the longitudinal or reference axis of the second shaft 36; in addition, each wall section 40, 42 is inclined relative to the central axis of the drive member 20 and the respective longitudinal axes of the shafts 30, 36.

A means 44 for urging the first shaft 30 and the second shaft 36 in respective, opposite directions generally toward each other includes threaded bolts 46, 48 which can best be appreciated by reference to FIG. 2. Bolt 46 extends in a bore formed along the longitudinal axis of the first shaft 30, and is received in threaded engagement with walls defining a bore in a plate 50 that is in contact with a side of the drive member 20 remote from the head of the bolt 46 and bearing assembly 34. On the other hand, bolt 48 extends through an aperture of a plate 52 in contact with the opposite side of the drive member 20 remote from plate 50, and bolt 48 is engaged with complemental threads formed in an internal bore that extends along the length of the second shaft 36.

The bolts 46, 48 when tightened bring the wall sections 40, 42 into a position of flat, wedging contact with each other for securely interconnecting the first shaft 30, the second shaft 36 and the drive member 20. In addition, the nature of the complemental, mutually engaging wall sections 40, 42 retains the rotative position of the first shaft 30 (i.e. in a direction about its longitudinal axis) in a fixed, pre-selected orientation relative to the rotative position of the second shaft 36 as well as relative to the drive member 20.

Optionally, groove 54 extending in parallelism with the longitudinal axis of the second shaft 36 may be formed in the second shaft end portion 38 as depicted in FIGS. 2 and 5. The groove 54 receives an elongated, square-in-cross-section key 56 that is also received in a second groove formed in the structure 26 defining the opening of drive member 20 as shown in FIG. 3. The key 56 insures that the shaft 36 is installed in drive member 20 at a certain rotative orientation relative to the latter, a feature especially useful when a third shaft (as described hereinafter) is utilized.

The provision of threaded bolts 46, 48 enables the drive mechanism 28 to be readily disassembled and released for enabling withdrawal of the shafts 30, 36 from the opening defining structure 26 of drive member 20 when desired. However, the mutually engaging wall sections 40, 42 upon reassembly of the drive mechanism 28 will inevitably cause the second shaft 36 to be brought into the certain, predetermined positional relationship relative to the drive member 20 and the first shaft 30 such as is depicted in FIGS. 1-3.

Referring now to FIG. 6, a central portion of the second shaft 36 is coupled to a component 58 that is, in turn, pivotally connected at opposite ends to short pitman links 60, 60. Each of the links 60 is pivotally coupled a sway bar 62 that extends along the side of the header 10 for reciprocation in a plane perpendicular to shafts 30, 36. As shown in FIG. 1, an upper end of the sway bar 62 is coupled by means of a pivot 64 to the header 10, while an opposite end of the sway bar 62 is coupled to a ball and socket connection 66 that is linked to one end of the sickle of sickle assembly 12.

During rotation of the drive member 20 about its central axis, the eccentric, second shaft 36 moves in an arc to correspondingly move component 58 which enables the short pitman links 60 to oscillate the sway bar 62 and horizontally, longitudinally reciprocate the sickle of assembly 12. The operation of component 58, links 60 and sway bar 62 is further described in some detail in the aforementioned patent, U.S. Pat. No. 3,941,003.

Referring now to FIG. 2, a second end portion of the second shaft 36 remote from the end portion 38 is received within an opening of a flywheel 68 that is also shown in FIG. 1. The opening formed in the flywheel 68 includes two juxtaposed, generally cylindrical regions in open communication with each other and similar in configuration to the opening-defining structure 26 of drive member 20. A third generally cylindrical shaft 70 includes an end portion that is received in one of the cylindrical regions of the opening of flywheel 68, and the third shaft 70 presents a longitudinal axis that is coincident with the longitudinal axis of first shaft 30 as well as with the central axis of drive member 20.

The second shaft 36 and the third shaft 70 each present flat wall sections 72, 74 respectively which extend in a plane perpendicular to a reference plane passing through the longitudinal axes of shafts 30, 36 and 70. The wall sections 72, 74 function in similar fashion to the wall sections 40, 42 and are operable to fixedly retain the third shaft 70 as well as the flywheel 68 in a predetermined rotative orientation relative to the orientation of the second shaft 36.

A bolt 76, similar to bolt 48, extends through a hole in a plate 78 and into a complementally threaded bore formed in the second shaft 36. Likewise, a bolt 80 extends along a central, longitudinal bore in the third shaft 70 and has threads engaged with threaded wall sections of a plate 82. The bolts 76, 80 represent a releasable means for urging the shafts 36, 70 in respective, opposite directions generally toward each other in order to bring the flat wall sections 72, 74 into a position of wedging contact with each other for securely interconnecting the second shaft 36 to the third shaft 70 and the flywheel 68 as well as the drive member 20 and first shaft 30. Finally, a key is received in a groove 84 and cooperates with key 54 to inevitably bring the first shaft 30 into true alignment with the third shaft 70.

It can now be appreciated that the drive mechanism 28 provides an especially efficient means for insuring that the flywheel 68 is maintained in coaxial relationship to the drive member 20. Moreover, the third shaft 70 is retained in a coaxial alignment with the first shaft 30, whereby the drive member 20 can be supported by bearings on both sides of the same. In this regard, a bearing assembly 86 connected to the third shaft 70 is shown in FIG. 1 for supporting the drive member 20 on a side of the same opposite from the side principally supported by upper bearing assembly 34.

It is to be understood, however, that use of the flywheel 68 is not essential to the success of the present invention. As a further example, the second shaft 36 and the third shaft 70 as best illustrated in FIG. 2 can optionally be replaced by a unitary component of the same overall configuration such that the portion of the component replacing the third shaft 70 is aligned with the central longitudinal axis of first shaft 30. As a consequence, the invention should be deemed limited only by a fair scope of the claims which follow.

I claim:

1. A releasable, eccentric drive mechanism comprising:
   a first shaft extending along a central axis and presenting a generally cylindrical portion;
   a second shaft extending along a reference axis substantially parallel to said central axis in offset relation to the latter and having a generally cylindrical portion;
   a drive member having structure defining an opening including a first, generally cylindrical region receiving over one half of the circumference of said first shaft portion and a second, generally cylindrical region receiving over one half of the circumference of said second shaft portion,
   said second region being in side-by-side relationship to said first region and in open communication with the latter,
   said first shaft portion and said second shaft portion each including a substantially flat wall section extending in a plane substantially perpendicular to a reference plane passing through said central axis and said reference axis,
   each of said wall sections being inclined relative to said central axis in complemental, flat engagement with each other; and
   means coupled to one of said drive member and said second shaft for urging said first shaft in a longitudinal direction generally toward said second shaft in order to bring said wall section of said first shaft into a position of flat, wedging contact with said wall section of said second shaft and in contact with said structure defining said opening in order to securely interconnect said first shaft, said second shaft and said drive member,
   said means being releasable for enabling withdrawal of one of said first shaft and said second shaft from said structure defining said opening in order to permit disassembly of said drive mechanism.

2. The invention as set forth in claim 1; including a key coupling said second shaft and said structure defining said opening of said drive member and extending in a direction generally parallel to said reference axis for assuring that said second shaft is in proper rotative orientation relative to said drive member.

3. A releasable, eccentric drive mechanism comprising:
   a first shaft extending along a central axis and presenting a generally cylindrical portion, said first shaft including walls defining a first bore;
   a second shaft extending along a reference axis substantially parallel to said central axis in offset relation to the latter and having a generally cylindrical portion;

a drive member having structure defining an opening including a first, generally cylindrical region receiving said first shaft portion and a second, generally cylindrical region receiving said second shaft portion, said second region being in side-by-side relationship to said first region and in open communication with the latter, said first shaft portion and said second shaft portion each including a substantially flat wall section extending in a plane substantially perpendicular to a reference plane passing through said central axis and said reference axis, each of said wall sections being inclined relative to said central axis in complemental, flat engagement with each other; and means coupled to one of said drive member and said second shaft for urging said first shaft in a longitudinal direction generally toward said second shaft in order to bring said wall section of said first shaft into a position of flat, wedging contact with said wall section of said second shaft and in contact with said structure defining said opening in order to securely interconnect said flat shaft, said second shaft and said drive member, said means being releasable for enabling withdrawal of one of said first shaft and said second shaft from said structure defining said opening in order to permit disassembly of said drive mechanism, said means including a plate having walls defining a second bore, and a bolt extending through one of said walls defining said first bore and said walls defining said second bore and in threaded engagement with the other of said walls defining said first bore and said walls defining said second bore.

4. The invention as set forth in claim 3; including means for releasably urging said second shaft in a direction generally toward said first shaft.

5. In a sickle drive mechanism having a sway bar and a wheel-like drive member with a central axis and coupled to a source of power, a releasable shaft assembly eccentrically connected to said sway bar for oscillating the latter and supporting said drive member for rotation about said axis comprising:

a first shaft extending along said axis and having a generally cylindrical portion;

a second shaft extending along a reference axis laterally offset from said central axis and presenting a generally cylindrical portion, said drive member having structure defining an opening including a first, generally cylindrical region receiving said portion of said first shaft and a second, generally cylindrical region receiving said portion of said second shaft, said second region of said opening being in side-by-side relationship to said first region in open communication with the latter;

a third shaft coupled to said second shaft remote from said first shaft and extending in a direction coaxial with said central axis, said first and said third shaft being adapted to support said drive member during rotation of the latter, said first shaft portion and said second shaft portion each including a substantially flat wall section extending in a plane generally perpendicular to a reference plane passing through said central axis and said reference axis, each of said wall sections being inclined relative to said central axis; and means for urging said first shaft and said second shaft in respective, opposite directions generally toward each other in order to bring said wall sections into a position of flat, wedging contact with each other for securely interconnecting said first shaft, said second shaft and said drive member, said means being selectively releasable for enabling withdrawl of at least one of said first shaft and said second shaft from said structure defining said opening in order to permit disassembly of said drive mechanism.

6. The invention as set forth in claim 5; and including a flywheel having structure defining an opening including a first, generally cylindrical region and a second, generally cylindrical region disposed in side-by-side relationship to said first region and in open communication with the latter, and wherein said second shaft and said third shaft extend into said first region and said second region of said flywheel opening respectively.

7. The invention as set forth in claim 6, wherein said second shaft and said third shaft each include generally flat, facing, interengaged wall segments extending in a plane substantially perpendicular to said reference plane for maintaining said third shaft in a certain, pre-selected orientation relative to said first shaft.

* * * * *